United States Patent [19]

Ho et al.

[11] 3,846,971

[45] Nov. 12, 1974

[54] PACKAGE FOR ELECTRONIC WATCH MOVEMENT

[75] Inventors: Ernest C. Ho, Newport Beach; Karl H. Reissmueller, Tustin; Richard J. Belardi, Anaheim, all of Calif.

[73] Assignee: Hughes Aircraft Company, Culver City, Calif.

[22] Filed: Mar. 21, 1973

[21] Appl. No.: 343,320

[52] U.S. Cl. .................................. 58/23 R, 58/50 R

[51] Int. Cl. .......................................... G04b 29/00

[58] Field of Search ....... 58/23 R, 23 BA, 50 R, 57, 58/88 R, 90 R, 91; 206/18, 46; 174/50.54, 50.5

[56] References Cited

UNITED STATES PATENTS

| | | | |
|---|---|---|---|
| 2,862,352 | 12/1958 | Burghoff | 58/90 R |
| 3,129,557 | 4/1964 | Fiechter | 58/23 R X |
| 3,316,459 | 4/1967 | Stutzman | 174/50.5 X |
| 3,456,152 | 7/1969 | Andersen | 58/50 R X |
| 3,466,498 | 9/1969 | De Koster et al. | 58/50 R |
| 3,505,804 | 4/1970 | Hofstein | 58/50 R X |
| 3,509,430 | 4/1970 | Mroz | 174/50.5 X |
| 3,540,207 | 11/1970 | Keeler | 58/23 R |
| 3,672,155 | 6/1972 | Bergey et al. | 58/50 R |
| 3,759,031 | 9/1973 | McCullough et al. | 58/50 R |

*Primary Examiner*—Richard B. Wilkinson
*Assistant Examiner*—U. Weldon
*Attorney, Agent, or Firm*—Allen A. Dicke, Jr.; W. H. MacAllister

[57] ABSTRACT

Integrated circuit chips are carried on the front of a substrate. Printed circuitry and other components on the front of the substrate aid in the connection of and operation of the circuit of which the integrated circuit chip forms a part. Furthermore, electronically controlled display devices such as light-emitting diodes can be positioned on the front of the substrate and interconnected into the circuit to be operated thereby. These components on the front of the substrate are hermetically sealed by means of a cover sealed to and extending over the front of the substrate. Thus, the substrate forms a part of the hermetically sealed unit.

10 Claims, 5 Drawing Figures

PACKAGE FOR ELECTRONIC WATCH MOVEMENT

BACKGROUND

This invention is directed to a package for an electronic watch movement, particularly relating to a printed circuit substrate with integrated circuits attached thereto.

Prior practice has been directed to the mounting of a bare semiconductor chip on a printed circuit substrate without hermetic seal protection of the chips in many applications of this nature. However, where higher reliability and more protection is required, the semiconductor chips are individually provided with hermetic packages. These packages, in turn, have been mounted on a substrate.

Such former prior art constructions resulted in devices which were less protected and the latter resulted in devices which were more bulky. Particularly in the case of light-emitting diodes, hermetic packaging has previously been unsatisfactory because it did not incorporate the associated electronics. Thus, there has been need for a superior packaging structure which incorporates the substrate as one part of the package.

SUMMARY

In order to aid in the understanding of this invention, it can be stated in essentially summary form that it is directed to a package for an electronic watch movement. The package comprises a substrate having a front face, with electronic components and circuitry mounted upon the front face of the substrate. An enclosing cover is spaced from the front of the substrate and is sealed to the substrate adjacent the edges of the substrate or adjacent the edges of the cover to define a hermetically sealed zone adjacent the face of the substrate.

Accordingly, it is an object of this invention to provide a package for components of an electronic watch movement. It is another object to provide a substrate having electronic components on the front face thereof, with a cover thereover to protect the components on the face of the substrate. It is yet another object to provide a substrate having integrated circuit chips and printed circuit interconnections on the front surface thereof, with a spaced cover over the chips and circuitry to protect those components. It is yet another object to hermetically seal such a cover with respect to such a substrate to provide hermetic sealing to protect such components from adverse conditions exterior their hermetically sealed zone. It is yet another object to provide a structure wherein a substrate having integrated circuits and interconnections thereon can be assembled and tested, and thereafter sealed in a hermetically sealed housing to protect the structure.

Other objects and advantages of this invention will become apparent from the study of the following portion of this specification, the claims and the attached drawings.

DESCRIPTION

Figures 1, 3, 5:
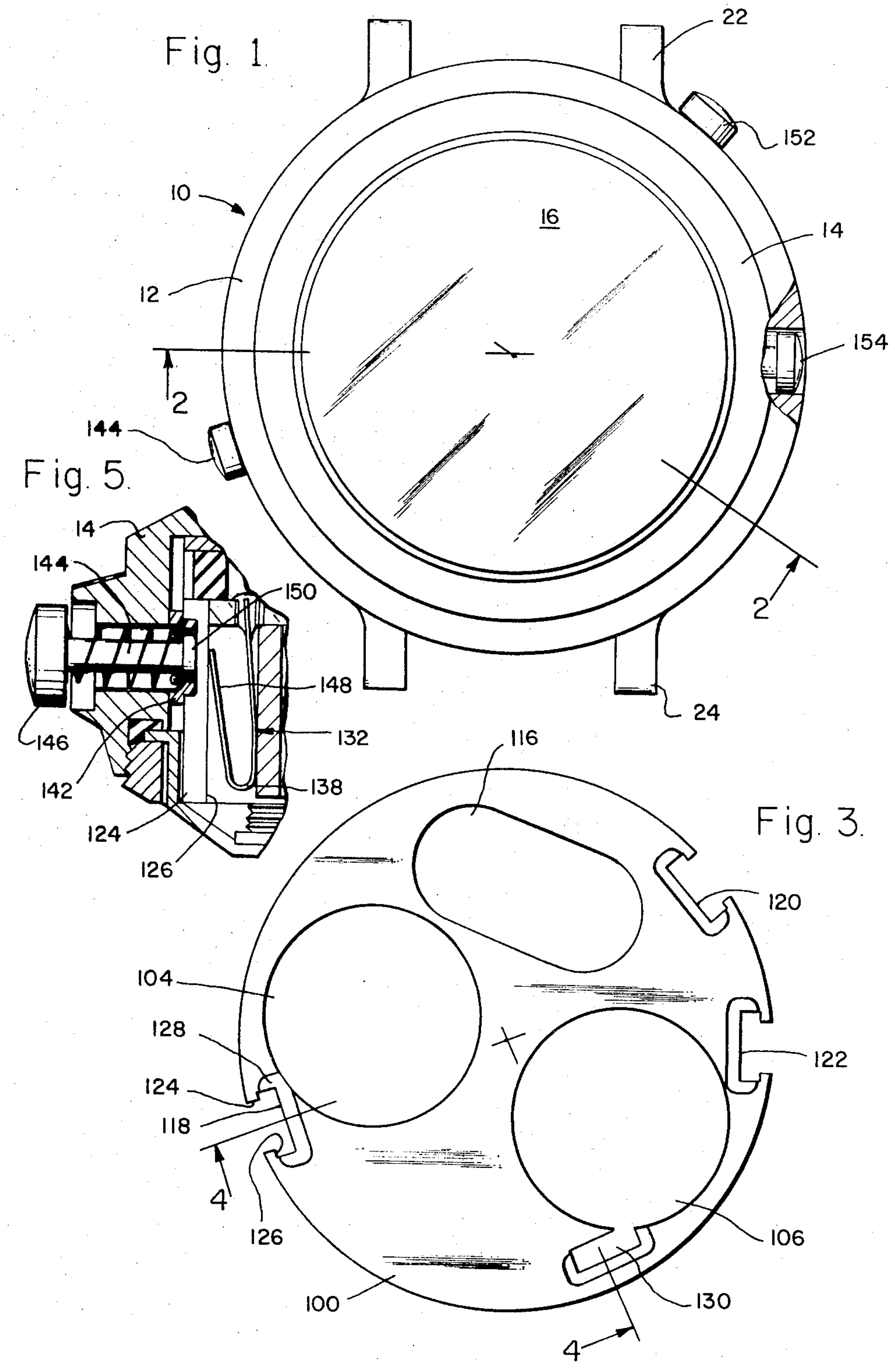
FIG. 1 is a top-plan view of an electronic watch having a structure in accordance with this invention.
FIG. 3 is a top plan view of the spacer block on the interior of the structure.
FIG. 5 is a partial section, showing generally the left-end structure of FIG. 4, with the push-button unactuated.
Figure 2:
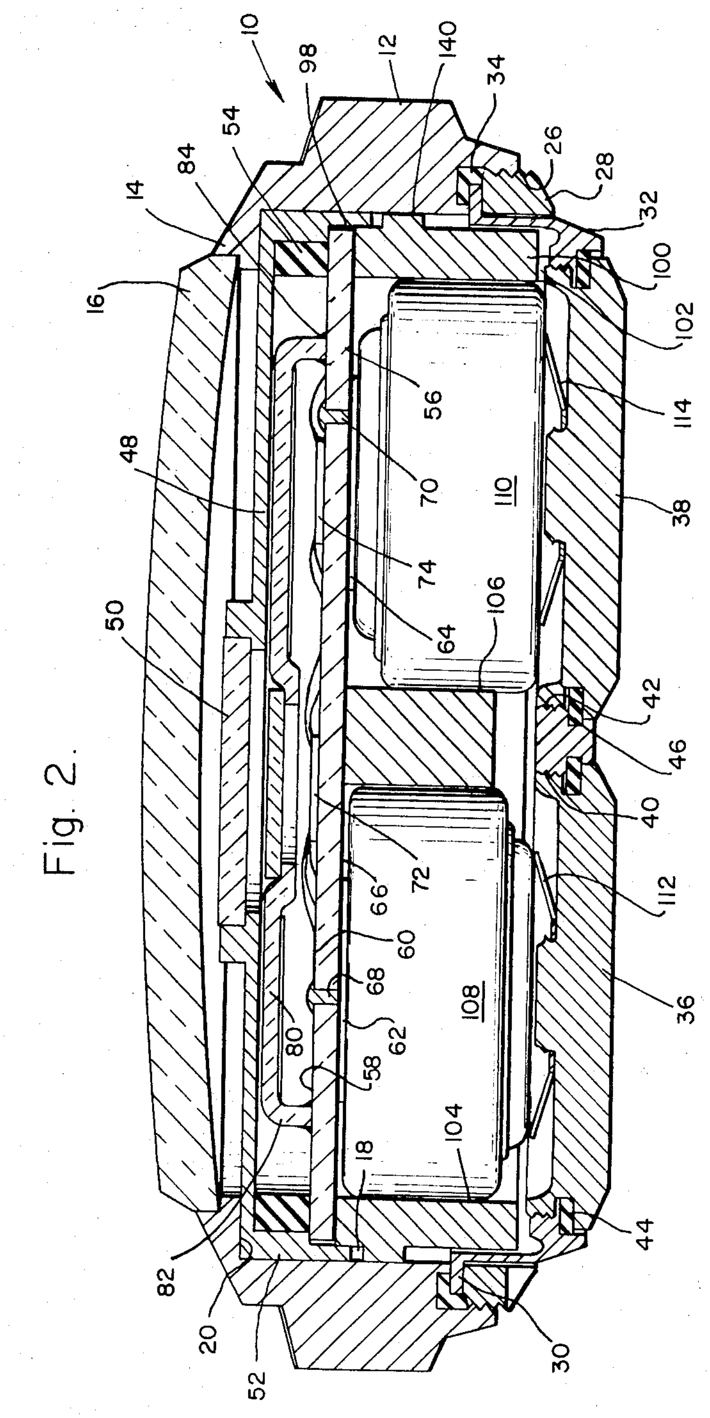
FIG. 2 is a section taken generally along line 2—2 of FIG. 1.
Figure 4:
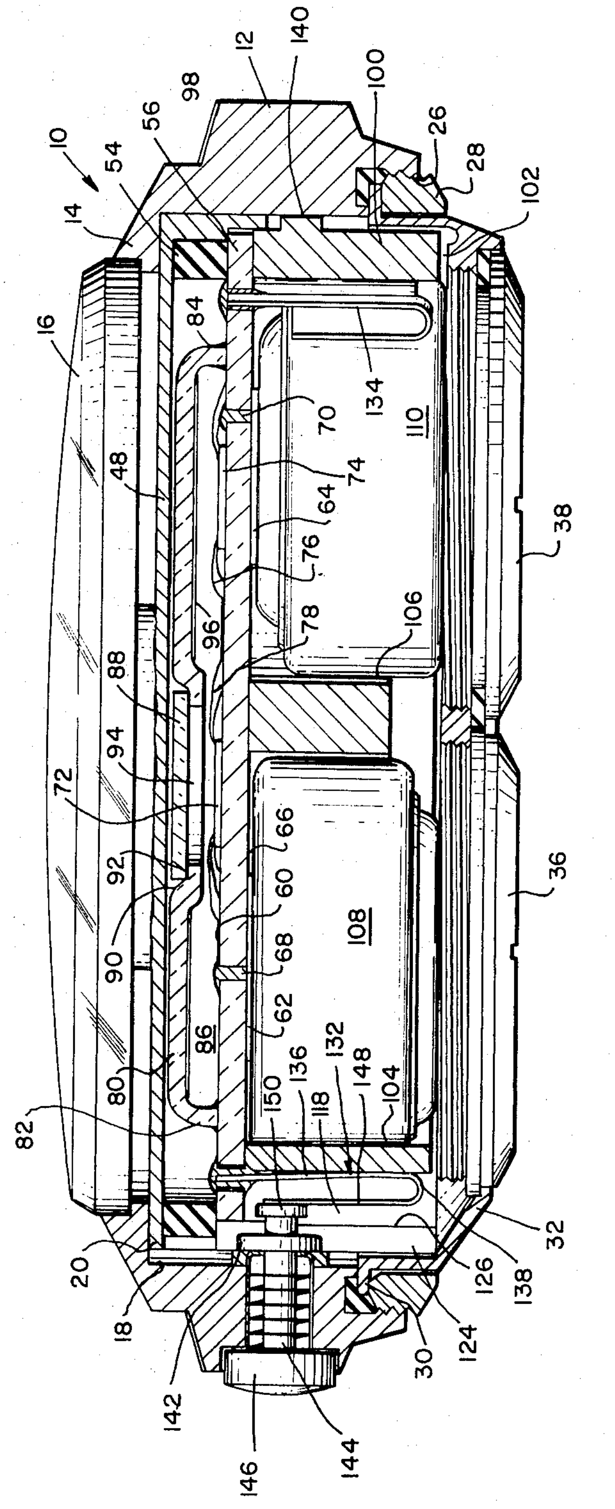
FIG. 4 is a section through the watch construction taken along the line 4—4 of FIG. 3.

The watch of this invention is generally indicated at 10 in FIGS. 1, 2 and 4. Watch 10 has a conventional case 12 which includes a bezel 14 which holds crystal 16. Interiorly, the watchcase 10 has an interior bore 18 which presents a cylindrical wall open to the back of the watchcase and a shoulder 20 beneath the bezel. Case 12 is provided with ear sets 22 and 24 of conventional construction for the attachment of a watchband. Alternatively, a ring for the attachment of a watch fob can be employed if the case is to be employed in pocket-watch service.

The rear of the case has screw threads 26 circumferentially in a recess therein, to the rearward of bore 18 and of larger diameter. Screw threads 26 receive lock ring 28 which thrusts the outwardly extending flange 30 of back 32 into metal-to-metal engagement with the main sidewall of the watchcase. Sealing ring 34 is compressed in this clamping operation to provide hermetic seal at that joint. This construction permits the back 32 to be installed without rotation. Preferably, a key is provided so that the back installs in only one particular relative angular position. If desired, another installation method, such as a snap-in arrangement could be used, providing adequate sealing is achieved. Battery hatch covers 36 and 38 are respectively screwed into battery hatch openings which have mating screw threads 40 and 42. Seal rings 44 and 46 are clamped between the hatch covers to provide the desired hermetic sealing. Metal-to-metal contact between the hatch covers and the back is accomplished through the screw threads.

Within watchcase 12, dial plate 48 is positioned within bore 18 and engages against shoulder 20. Dial plate 48 can carry any convenient ornamental figuration, but at least the center must have a window therethrough to permit the lighted time signal to be seen. Window 50 is illustrated. Dial plate 48 is generally in the shape of a disc occupying the space beneath crystal 16 and engaging against shoulder 20. A downwardly directed cylindrical flange 52 engages in bore 18. Engaged against the interior of dial plate 48 is resilient ring 54. Ring 54 is for the purpose of resilient mounting. It is preferably of elastomeric material such as rubber or a synthetic polymer composition material having rubber-like characteristics.

Mounted against resilient ring 54 is substrate 56. Substrate 56 is a suitable insulative substrate for the carrying of printed circuitry thereon. It is fairly rigid and inert. A ceramic material substrate is preferred, although filled synthetic polymer composition material substrates such as fiberglass filled phenolic is suitable. substrate 56 has a front 58 on which is carried printed circuit interconnections, one of which is indicated at 60. Furthermore, printed circuitry, such as circuits 62 and 64 which serve as battery contact pads, can be located on the back 66 of the substrate. Through connections, such as those indicated at 68 and 70, can be provided through the substrate to interconnect the printed circuitry on the opposite sides. These are conventionally accomplished by means of providing a hole through the substrate, plating it, and then filling it with solder to interconnect circuitry on both sides.

The most important components on the front of this substrate comprise first the device which is visible to indicate the signal output from the watch. In the present case, a light-emitting diode 72 is located beneath window 50. The light-emitting diode is configured so that, upon proper energization, it emits light corresponding to a particular predetermined pattern. By energizing the proper pattern groups, intelligible displays, such as numbers, can be created and read. It is the display of the light-emitting diode 72 that provides the visible indication of the time indicated by the watch movement. While a light-emitting diode is indicated to be the preferred display device, other light-emitting devices, or selectively visible devices such as liquid crystal displays, are also feasible to use.

Also mounted upon the front of substrate 56 is integrated circuit chip 74. The chip 74 is secured in place by adhesive and is connected by wires soldered between the pads on the integrated circuit chip and the printed circuit wiring. These interconnecting wires are shown at 76, and similar wires 78 connect the light-emitting diode to the printed circuitry. The integrated circuit chip is conventionally a metal oxide silicon integrated circuit chip, and may be of the complementary type having both P-channel and N-channel transistors therein. The CMOS integrated circuits are the present-day most satisfactory circuits. for the sake of manufacturing convenience and economy, the integrated circuit chip 74 is not encapsulated, but is secured bare on the top of the substrate.

In order to provide hermetic sealing for the printed circuitry on the front of the substrate, for the light-emitting diode mounted thereon, and for the integrated circuit chip 74 mounted thereon, cover 80 is mounted thereover. Cover 80 is preferably in the form of a disc having a circular down-turned flange 82. The lower edge of the flange 82 is in direct contact with the front 58 of substrate 56. The circular flange is hermetically sealed thereto by means of adhesive 84 of other convenient sealant. Before sealing is accomplished, the volume above the substrate is appropriately treated to create a hermetically sealed zone 86 above the active components secured to the substrate. This zone may be filled with a suitable inert gas or the like to provide an optimum condition for the environment for the light-emitting diode, the printed circuit and the integrated circuit chip, without the need for other types of encapsulation or protection from atmospheric or mechanical damage. It is to be noted that the substrate within the area defined by flange 82 is a closed wall. There are no openings therethrough which are not filled with sealant of one type or another. For example, the solder-filled through holes are closed, as far as hermetic sealing is concerned. It is for the reason that the substrate serves as one wall of the hermetically sealed zone that a ceramic or other inorganic substrate is preferred to one that contains organics.

In order to permit light-emitting diode 72 to be visually observed through crystal 16, window 88 is provided over the light-emitting diode 72. Window 88 is inserted into a recess 90 which is defined on the bottom by a depressed flange 92. Opening 94 in the depressed flange defines the area through which light can enter from the exterior ambient conditions into hermetically sealed zone 86. In order to limit the amount of light which can reach chip 74, the opening 94 is positioned over light-emitting diode 72. Window 88 is adhesively sealed against flange 92 to maintain the hermetically sealed character of zone 86. The light-emitting diode 72 emits light of particular wavelength. In the case where the wavelength is principally red, window 88, window 50 or preferably crystal 16 is formed of transparent material having filter characteristics which preferentially passes the wavelength of the light-emitting diode. For example, when the principal wavelength is red, the filter color is red. In those cases where the front of dial plate 48 carries figuration of interest, the filter can be in window 88 or window 50. In the case where the face of dial plate 48 has nothing of significance or ornamental interest thereon, crystal 16 can be of filter material so that the entire front of the crystal gives a uniform appearance. The filter characteristics of the crystal or one of the windows reduces the light passing through opening 94 into the hermetically sealed area.

Some integrated circuit chips, and particularly MOS chips and CMOS chips, are sensitive to light. In the case of watch 10, if it was taken into the direct sunlight, even with a suitable filter in one of the windows, sufficient light may enter the hermetically sealed zone so that it would photon-activate the integrated circuit chips 78, or other similar chips on the substrate, to render the watch logic inaccurate. Thus, the interior of cover 80 is coated with a nonreflective coating, at least over integrated circuit chip 74. Thus, coating layer 96 is a surface treatment at least over the chip and preferably over the entire interior surface of cover 80, except for the window. Coating layer 96 is preferably of such character as to absorb a maximum amount of the actinic energy or photons which enter into the hermetically sealed space. Thus, a mat or flat black surface finish is preferable. As illustrated, the coating layer extends over the entire flat interior surface of the cover, so that light entering opening 94 is sufficiently absorbed and nonreflected by coating layer 96 so that insufficient photons impinge the integrated circuit chip 74 and its companion chips if any, so that their logic is not interfered with by photon activity. In this way, the integrated circuit chips can be directly attached to the substrate without individual encapsulation.

Substrate 56 fits within the flange 52 of dial plate 48. It is of smaller diameter than the flange so that there is spacing between the outer wall 98 of the substrate and the interior of the flange. In this way, the substrate has a certain amount of lateral freedom within the case. In this sense, lateral freedom is in the direction generally of the plane of the substrate and in the general flat direction of watch 10, and perpendicular to a normal line through the watchcase.

FIG. 3 illustrates spacer block 100 which engages beneath the substrate, as seen in FIGS. 2 and 4. The height of spacer block 100 is such that it does not quite reach from substrate 56 down to watchback 32. Thus, the substrate 56 is not rigidly supported from the watchback. A space 102 is present. Spacer block 100 has two circular openings 104 and 106 therein. These openings receive batteries 108 and 110, respectively. As is seen in FIG. 2, battery springs 112 and 114 respectively engage upon the bottom of batteries 108 and 110 to thrust the batteries upward. The batteries respectively contact battery pads on the underside of the substrate, represented by printed circuit 62 and 64, respectively. The battery springs thus urge the batteries up into engagement with the substrate 56 which, in turn, is urged upward against the resilient ring 54. Thus, in a normal direction, the substrate is resiliently supported between the battery springs and the resilient ring 54. Thus, resilient support in that direction reduces the shock loading on the substrate due to normal shock applied to the watchcase.

Spacer block 100 also has opening 116 therein. This opening receives one or more components extending down from the bottom or backside of the substrate. In the particular case, an oscillator crystal is mounted upon the back of the substrate and extends into this opening. spacer block 100 is preferably of synthetic polymer composition material which can be suitably molded. It can be a polycarbonate or a glass-loaded phenolic. Any other conveniently moldable material having suitable dimensional characteristics and high dielectric strength is suitable.

Three tee slots 118, 120 and 122 are molded around the periphery of spacer block 100. Tee slot 118 is shown at the left side of the section of FIG. 4. Tee slot 118 extends from top to bottom through the spacer block. It includes radial slot walls 124 and inwardly facing shoulders 126. Furthermore, the top of the tee slot is chamfered at 128 to provide clearance at the upper face of the spacer block around the tee slots where the spacer block engages against the bottom of substrate 56.

A similar slot 130 is formed through spacer block 100, away from the outer peripheral edge thereof, but intersecting with the circular opening of battery bore 106.

four identical J-shaped springs are secured in the substrate and extend downwardly therefrom. Two of these springs are illustrated in FIGS. 4 and 5 at 132 and 134. The springs 132 and 134 respectively engage down into slots 118 and 130. Each of the four springs is arranged with its longer or shank end 136 ridigly mounted on substrate 56. The springs are mounted upon the substrate so that the unstressed angle is such that the U-bend 138 extends inwardly toward the median line of the watch and in such a direction that it is urged toward the bottom of its respective slot. Thus, substrate 56 is resiliently mounted in a lateral direction with respect to spacer block 100. Spacer block 100 has a shoulder 140 which fairly closely fits within bore 18 so that it is laterally fixed with respect to the watchcase. Thus, the substrate is resiliently mounted in the lateral direction with respect to the spacer block and the watchcase. Rotation of the spacer block within the watchcase is prevented by the nose 142 of push-button assembly 144 engaging between the radial walls 124. When the push-button 146 is not depressed, the free end 148 of spring 132 rests against inwardly facing shoulders 126 so that the electrical contact 150 on the front of the plunger of the push-button assembly is out of contact with the spring. On the other hand, when the push-button is depressed as is shown in FIG. 4, electrical continuity is achieved between the push-button assembly and the free end 148 of the spring. Thus, each of the springs accomplishes the double objective of resilient mounting of the substrate and electrical contact therewith. The upper end of the spring on the substrate is electrically connected to the circuitry of the watch movement. The push-button assemblies associated with slots 118 and 120 are seen at 144 and 152 in FIG. 1. These are easily accessible push-buttons which extend from the watchcase. Push-button assembly 154 is not to be inadvertently used and thus is flush with the exterior of the case when not actuated. When any one of these push-buttons is pressed, the intermediate voltage found in the watchcase by virtue of battery springs 112 and 114 is connected to an appropriate point in the integrated circuit.

In the structure described, the preferable circuit is an electronic oscillator circuit powered by the batteries with a suitable frequency divider and memory so that a signal corresponding to the present time in day number, hours, minutes and seconds is stored and updated. When push-button 152 is pressed, the hour and minute signal is displayed upon the light-emitting diode 72. When the push-button 144 is pressed to provide the corresponding electrical connection to the printed circuit on the substrate, the light-emitting diode provides a signal corresponding to the number of the day of the month. When both the push-buttons 144 and 152 are depressed, the signal emitted corresponds to the time in seconds. Push-button 154 is employed for setting the watch. As is seen in FIG. 4, spring 134 engages with the side of battery 110 to provide the intermediate voltage continuously to another portion of the circuit on the substrate. Thus, resilient mounting of the substrate with respect to the watchcase is accomplished, together with proper location of the substrate, as well as the required electrical contact.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

We claim:

1. A package for packaging components of a digital electronic watch movement in a watch case comprising:

a substantially flat substrate having a peripheral edge and a face and a back, said substrate being fabricated from insulative material;

at least one bare integrated circuit chip secured to said face of said substrate;

an electronically controlled digital display device mounted on the face of said substrate;

means for electrically coupling said integrated circuit chip to said display device;

a cover positioned over the portions of said substrate which include said integrated circuit chip and said display device, said cover being substantially flat where it extends over said substrate and having downturned flanges along the edge of said cover, said cover having a transparent window therein positioned over said display device, said cover being optically opaque away from said window said cover being attached at its downturned flanges to the front of said substrate and spaced by said flanges over said display device and said chip to enclose the integrated circuit chip and display device within a protected volume defined by said flanges, cover, and substrate.

2. The package of claim 1 wherein said transparent area in the cover is created by an opening in said cover, said opening being recessed and defined on the bottom by a depressed flange, said opening having a transparent material of approximately the same thickness as the depth of the recess hermetically sealed against said flange, said transparent material being substantially coplanar with the top surface of said cover.

3. The package of claim 1 wherein a mounting means is engaged against said annular area of substrate for mounting said substrate within the watchcase.

4. The package of claim 2 wherein both the cover is hermetically sealed to the substrate and the transparent material is hermetically sealed to the cover by means of an adhesive.

5. The package of claim 4 wherein the substrate is formed of ceramic material.

6. The package of claim 4 wherein the substrate is formed of vitreous material.

7. The package of claim 5 wherein a mounting means is engaged against said annular area of substrate for mounting said substrate within the watchcase.

8. The package of claim 7 wherein the hermetically sealed zone defined by the seal, substrate, and cover is filled with an inert gas.

9. The package of claim 8 wherein the electronically controlled display device is of the light-emitting type.

10. The package of claim 9 wherein said transparent material has filter characteristics which passes substantially only the wavelengths of the light-emitting electronically controlled display device.

* * * * *